United States Patent
Lee et al.

(10) Patent No.: US 8,101,297 B2
(45) Date of Patent: Jan. 24, 2012

(54) ORGANIC ELECTROLYTIC SOLUTION AND LITHIUM BATTERY USING THE SAME

(75) Inventors: Seok-soo Lee, Suwon-si (KR); Dong-joon Lee, Seoul (KR); Young-gyoon Ryu, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 662 days.

(21) Appl. No.: 12/196,371

(22) Filed: Aug. 22, 2008

(65) Prior Publication Data
US 2009/0226818 A1    Sep. 10, 2009

(30) Foreign Application Priority Data

Mar. 7, 2008  (KR) .................. 10-2008-0021565

(51) Int. Cl.
*H01M 6/04*    (2006.01)

(52) U.S. Cl. ........ 429/200; 429/199; 429/326; 429/330; 429/332; 429/341; 429/307; 252/62.2

(58) Field of Classification Search .................. 429/200, 429/199, 326, 330, 332, 341, 307; 252/62.2
See application file for complete search history.

(56) References Cited

U.S. PATENT DOCUMENTS

| 5,232,795 | A | 8/1993 | Simon et al. |
| 5,310,553 | A | 5/1994 | Simon et al. |
| 5,626,981 | A | 5/1997 | Simon et al. |
| 5,707,759 | A | 1/1998 | Simon et al. |
| 2006/0147809 | A1* | 7/2006 | Amine et al. ............ 429/330 |

FOREIGN PATENT DOCUMENTS

JP        8-045545        2/1996

* cited by examiner

*Primary Examiner* — Laura Weiner

(74) *Attorney, Agent, or Firm* — Christie, Parker & Hale, LLP

(57) ABSTRACT

An organic electrolytic solution including a lithium salt; an organic solvent including a high dielectric solvent and a low boiling point solvent; and an additive compound containing an electron withdrawing group and hydrocarbon-based substituents. A lithium battery using the organic electrolytic solution can have improved cycle characteristics and cycle life through preventing decomposition of the electrolyte.

10 Claims, 3 Drawing Sheets

ORGANIC ELECTROLYTIC SOLUTION AND LITHIUM BATTERY USING THE SAME

CROSS-REFERENCE TO RELATED PATENT APPLICATION

This application claims the benefit of Korean Patent Application No. 2008-21565, filed on Mar. 7, 2008 in the Korean Intellectual Property Office, the disclosure of which is incorporated herein by reference.

BACKGROUND OF THE INVENTION

1. Field of the Invention

Aspects of the present invention relate to an organic electrolytic solution and a lithium battery including the same, and more particularly, to an organic electrolytic solution in which decomposition of an electrolyte included in an organic electrolytic solution is prevented to improve cycle characteristics of a battery including the organic electrolytic solution, and in which an additive that can prevent cycle deterioration is introduced to improve performance of a battery including the organic electrolytic solution, as well as a lithium battery with improved cycle characteristics as a result of including the organic electrolytic solution.

2. Description of the Related Art

Due to the development of electronic industries, portable and wireless electronic devices, such as portable phones, digital cameras, notebook computers, and the like have been widely used. Thus, there is an increasing demand for secondary batteries that are lightweight, small in size, and have a high energy density, as a driving power source of such electronic devices. Of these secondary batteries, research has been actively conducted into lithium batteries that comprise a non-aqueous electrolytic solution, a lithium-containing metal oxide having a voltage of 4 V as a cathode active material, and a carbon material that can insert and remove lithium as an anode. Such batteries have a high voltage and high energy density.

The average discharge voltage of lithium batteries is in a range of about 3.6 to about 3.7 V, which is relatively higher than that of other alkali batteries, nickel metal hydride batteries, or nickel-cadmium batteries. However, in order to attain such a high operating voltage, it is necessary to form an electrolytic solution that is electrochemically stable at a charge/discharge voltage within a range of 0 to 4.2 V. To this end, a mixture of a cyclic carbonate-based solvent such as ethylene carbonate, propylene carbonate, butylene carbonate, or the like is widely used as the electrolytic solution.

In the case of an ethylene carbonate-based electrolyte, stability and thermal stability of a battery are decreased because of electrolyte decomposition at a high voltage and subsequent gas generation. To address these problems, research into propylene carbonate-based electrolytes having an excellent stability at a high voltage has been actively conducted. However, when a propylene carbonate-based electrolyte is used, solvent decomposition and co-insertion of lithium and electrolyte continuously occur on the surface of the negative electrode. Thus, it is difficult to form a uniform solid electrolyte interface (SEI) film. That is, the solvent and lithium ions are simultaneously inserted into carbon materials, and thus charge-discharge efficiencies are decreased.

After being formed at an initial stage, the SEI film prevents lithium ions from reacting with a carbon negative electrode or other materials during charging and discharging, thereby acting as an ion tunnel. The ion tunnel prevents disintegration of the structure of the carbon negative electrode from co-insertion of lithium ions and high molecular weight organic solvent molecules moving with the lithium ions by solvation at the carbon negative electrode. Thus, in the formation of the SEI film, lithium ions do not react again with the carbon negative electrode or other materials. As a result, the concentration changes of lithium ions are reversible and can be maintained within acceptable ranges.

However, as charge-discharge cycles occur, expansion and contraction of an electrode plate occur repeatedly and a partial over-voltage also occurs. Because of these changes, a passivation layer such as an SEI film slowly disintegrates as time goes by. Thus, a side reaction with the surface of the anode exposed to the surrounding electrolytic solution occurs continuously. Accordingly, gases such as carbon monoxide (CO), carbon dioxide ($CO_2$), methane ($CH_4$), ethane ($C_2H_6$), or the like are generated depending on the type of carbonate used and the anode active material. Because of this continuous generation of gases, the pressure in the battery increase and the battery's cycle characteristics decrease significantly.

In addition, a carbonate-based electrolytic solution is decomposed by a graphite-based anode active material, and delamination of carbon materials occurs. As a result, capacitance, cycle characteristics and retention characteristics of the battery decrease. In particular, such a phenomenon significantly occurs in an electrolytic solution containing propylene carbonate. In addition, during initial charging, the propylene carbonate decomposes on the anode, resulting in a large reduction of initial capacity.

As a method of preventing decomposition of cyclic carbonates by the graphite-based anode active material and delamination of carbon materials, adding a crown ether to an electrolytic solution based on propylene carbonate and ethylene carbonate has been proposed. However, this is not practical because a large amount of the crown ether, which is expensive, should be added, resulting in poor economic efficiency, and insufficient improvement in battery characteristics.

Japanese Patent Laid-Open Publication No. hei 8-45545 (corresponding to U.S. Pat. No. 5,626,981) discloses a method of adding vinylene carbonate to an electrolyte based on propylene carbonate and ethylene carbonate in order to prevent decomposition of the electrolyte. According to this method, the vinylene carbonate is reduced at a graphite anode during charge cycles and forms an insoluble film on the surface of the anode, thereby preventing reduction of solvents such as propylene carbonate and ethylene carbonate.

However, this method using vinylene carbonate alone cannot accomplish the formation of a complete SEI film at the first charge cycle. As charge and discharge cycles are repeated at room temperature, the film may crack and vinylene carbonate decomposes and is used up. Ultimately, it is not possible to obtain the desired stable cycle life characteristics of a battery. Further, although cycle life characteristics of a battery may improve by increasing the amount of vinylene carbonate, the method still has problems in that the discharge capacity of a battery decreases rapidly at low temperature and swelling of a battery may occur when the battery is stored at high temperature.

SUMMARY OF THE INVENTION

Aspects of the present invention provide an organic electrolytic solution in which a compound is used to induce decomposition (reduction) at a potential higher than the decomposition potential of typical carbonate-based solvents, and thus a uniform and compact solid electrolyte interface (SEI) film is formed before decomposition of the organic solvent. Aspects of the present invention also provide a lithium battery including the organic electrolytic solution.

One aspect of the present invention provides an organic electrolytic solution comprising: a lithium salt; a non-aqueous organic solvent; and a compound represented by Formula 1 below:

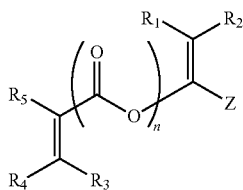

<Formula 1> wherein n is an integer of 1 to 5,

Z is an electron withdrawing group, and $R_1$, $R_2$, $R_3$, $R_4$, and $R_5$ may each independently be, a hydrogen atom, a halogen atom, a nitro group, a cyano group, a carboxyl group, a sulfonyl group, a carboxyaldehyde group, a carboxyamido group, a quaternary amine group, a substituted or unsubstituted $C_{2-30}$ acyl group, a substituted or unsubstituted $C_{1-20}$ alkyl group, a substituted or unsubstituted $C_{1-20}$ heteroalkyl group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{6-30}$ heteroaryl group, a substituted or unsubstituted $C_{7-30}$ alkylaryl group, a substituted or unsubstituted $C_{7-30}$ arylalkyl group, a substituted or unsubstituted $C_{6-30}$ aryloxy group, a substituted or unsubstituted $C_{1-20}$ alkoxy group, a substituted or unsubstituted $C_{2-20}$ alkoxycarbonyl group, a substituted or unsubstituted $C_{7-30}$ aryloxycarbonyl group, a $C_{8-30}$ aralkyloxycarbonyl group, or a substituted or unsubstituted $C_{1-20}$ haloalkyl group.

The electron withdrawing group may be one selected from the group consisting of a cyano group, a nitro group, a halogen atom, and a substituted or unsubstituted $C_{1-20}$ haloalkyl group. In Formula 1, n may be 1.

The concentration of the compound of Formula 1 may be in the range of 0.01 to 10 wt % based on the total weight of the organic electrolytic solution. The concentration of the compound of Formula 1 may be in the range of 1 to 5 wt % based on the total weight of the organic electrolytic solution.

The non-aqueous organic solvent may be a mixed organic solution comprising a high dielectric solvent and a low boiling point solvent. The non-aqueous organic solvent may comprise at least one compound selected from the group consisting of a cyclic carbonate, a non-cyclic carbonate, an aliphatic carboxylic acid ester, a non-cyclic ether, a cyclic ether, an alkyl phosphoric acid ester, and a fluoride.

The cyclic carbonate may comprise at least one compound selected from the group consisting of ethylene carbonate, propylene carbonate, butylene carbonate, and vinylene carbonate. The lithium salt may comprise at least one compound selected from the group consisting of $LiPF_6$, $LiBF_4$, $LiAsF_6$, $LiClO_4$, $LiCF_3SO_3$, $LiSbF_6$, $LiN(SO_2CF_3)_2$, $LiC_4F_3SO_3$, $LiAlF_4$, $LiAlCl_4$, $LiN(SO_2C_2F_5)_2$, $LiN(C_xF_{2X+1}SO_2)(C_yF_{2+y}SO_2)$ where x and y are each independently a natural number, LiCl, and LiI.

The compound of Formula 1 may be a compound represented by Formula 2 below:

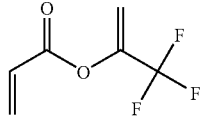

<Formula 2>

Another aspect of the present invention provides a lithium battery comprising: the organic electrolytic solution; a cathode; an anode; and a separator disposed between the cathode and the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
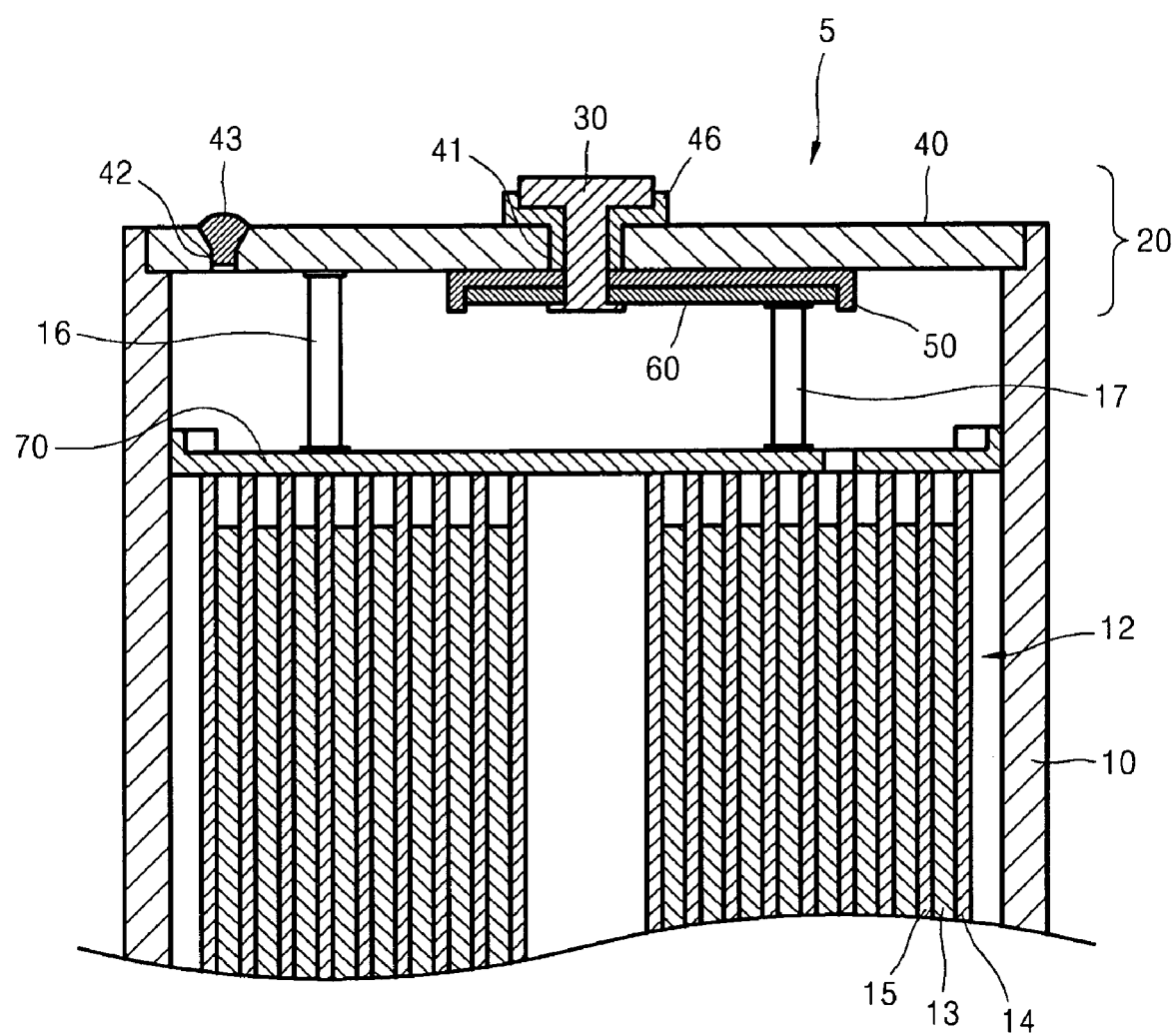
FIG. 1 is a schematic diagram illustrating the structure of a lithium battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide an organic electrolytic solution in which a compound represented by Formula 1 below is used as an additive to induce decomposition (reduction) at a potential higher than the decomposition potential of an organic solvent used in the organic electrolytic solution, and thus a uniform and compact solid electrolyte interface (SEI) film is formed on a surface of an electrode before decomposition of the organic solvent.

The film formed using the compound of Formula 1 enables charge and discharge of lithium ions, and prevents electrolyte decomposition and co-insertion of the organic solvent and the lithium ions on the surface of the electrode. In addition, the film decreases exposure of an electrode surface due to volume expansion of the electrode by discharge, and accordingly, a side reaction occurring on the electrode surface is prevented. That is, an organic electrolytic solution in which the compound of Formula 1 is used to uniformly form a modified SEI film on the surface of the electrode can be obtained, and thus electrolyte decomposition is prevented, resulting in an improvement in cycle characteristics of a lithium battery and prevention of cycle deterioration. A lithium battery using the organic electrolytic solution can also be obtained that has improved cycle characteristics.

The additive used in the organic electrolytic solution may be represented by Formula 1 below:

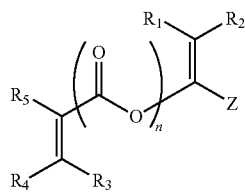

<Formula 1> wherein n is an integer of 1 to 5,

Z is an electron withdrawing group, and $R_1$, $R_2$, $R_3$, $R_4$, and $R_5$ may be each independently a hydrogen atom, a halogen atom, a nitro group, a cyano group, a carboxyl group, a sulfonyl group, a carboxyaldehyde group, a carboxyamido group, a quaternary amine group, a substituted or unsubstituted $C_{2-30}$ acyl group, a substituted or unsubstituted $C_{1-20}$ alkyl group, a substituted or unsubstituted $C_{1-20}$ heteroalkyl group, a substituted or unsubstituted $C_{2-20}$ alkenyl group, a substituted or unsubstituted $C_{2-20}$ alkynyl group, a substituted or unsubstituted $C_{6-}$ can be obtained aryl group, a substituted or unsubstituted $C_{6-30}$ heteroaryl group, a substituted or unsubstituted $C_{7-30}$ alkylaryl group, a substituted or unsubstituted $C_{7-30}$ arylalkyl group, a substituted or unsubstituted $C_{6-30}$ aryloxy group, a substituted or unsubstituted $C_{1-20}$ alkoxy group, a substituted or unsubstituted $C_{2-20}$ alkoxycarbonyl group, a substituted or unsubstituted $C_{7-30}$ aryloxycarbonyl group, a $C_{8-30}$ aralkyloxycarbonyl group, or a substituted or unsubstituted $C_{1-20}$ haloalkyl group.

The term "acyl group" used herein may be, for example, a $C_{2-20}$ aliphatic acyl such as acetyl, propionyl, or the like; a $C_{7-30}$ aromatic acyl such as benzoyl, or the like; or other acyl groups.

The term "aliphatic acyl" used herein refers to radicals of formula alkyl-C(O)—, alkenyl-C(O)— and alkynyl-C(O)— derived from an alkane-, alkene- or alkyncarboxylic acid. Examples of such aliphatic acyl radicals include, but are not limited to, acetyl, propionyl, butyryl, valeryl, 4-methylvaleryl, acryloyl, crotyl, propiolyl, and methylpropiolyl.

The $C_{1-20}$ alkyl group used herein as a substituent has a linear or branched structure, and may preferably be a $C_{1-12}$ alkyl group, more preferably a $C_{1-8}$ alkyl group, and most preferably a $C_{1-4}$ alkyl group. Examples of such alkyl group may include methyl, ethyl, propyl, isobutyl, sec-butyl, tert-butyl, pentyl, iso-amyl, hexyl, and the like. At least one hydrogen atom of the alkyl group may be substituted with a halogen atom, a hydroxy group, a nitro group, a cyano group, or the like.

The $C_{1-20}$ alkoxy group used herein as a substituent has an —O-alkyl structure wherein the oxygen atom is bound to the main chain. The alkoxy group may preferably be a $C_{1-12}$ alkoxy group, more preferably a $C_{1-8}$ alkoxy group, and most preferably a $C_{1-4}$ alkoxy group. Examples of such alkoxy group may include a methoxy group, an ethoxy group, a propoxy group, and the like. At least one hydrogen atom of the alkoxy group may be substituted with a halogen atom, a hydroxy group, a nitro group, a cyano group, or the like.

The $C_{2-20}$ alkenyl group used herein as a substituent has a linear or branched structure, wherein at least one unsaturated double bond is substituted in the alkyl group defined above. At least one hydrogen atom of the alkenyl group may be substituted with a halogen atom, a hydroxy group, a nitro group, a cyano group, or the like.

The $C_{2-20}$ alkynyl group used herein as a substituent has a linear or branched structure, wherein at least one unsaturated triple bond is substituted in the alkyl group defined above. At least one hydrogen atom of the alkynyl group may be substituted with a halogen atom, a hydroxy group, a nitro group, a cyano group, or the like.

The $C_{6-30}$ aryl group used herein as a substituent refers to a carbocyclic aromatic system containing at least one aromatic ring, and may be preferably be a $C_{6-20}$ aryl group, and more preferably a $C_{6-10}$ aryl group. The aromatic rings may be bound to each by a single bond or fused with each other. At least one hydrogen atom of the aryl group may be substituted with a halogen atom, a hydroxy group, a nitro group, a cyano group, or the like. Examples of such aryl group may include a phenyl group, a halophenyl group (for example, o-, m- and p-fluorophenyl group, a dichlorophenyl group), a cyanophenyl group, a dicyanophenyl group, a trifluoromethoxyphenyl group, a biphenyl group, a halobiphenyl group, a cyanobiphenyl group, a $C_1$-$C_{10}$ biphenyl group, a $C_1$-$C_{10}$ alkoxybiphenyl group, o-, m- and p-tolyl group, o-, m- and p-cumenyl group, a mesityl group, a phenoxyphenyl group, an (α,α-dimethylbenzene)phenyl group, an (N,N'-dimethyl)aminophenyl group, an (N,N'-diphenyl)aminophenyl group, a pentalenyl group, an indenyl group, a naphthyl group, a halonaphthyl group (for example, fluoronaphthyl group), a $C_1$-$C_{10}$ alkylnaphthyl group (for example, a methylnaphthyl group), a $C_1$-$C_{10}$ alkoxynaphthyl group (for example, a methoxynaphthyl group), a cyanonaphthyl group, an anthracenyl group, an azulenyl group, a heptalenyl group, an acenaphthylenyl group, a phenalenyl group, a fluolenyl group, an anthraquinonyl group, a methylanthryl group, a phenanthryl group, a triphenylene group, a pyrenyl group, a chrysenyl group, an ethyl-chrysenyl group, a picenyl group, a perylenyl group, a chloroperylenyl group, a pentaphenyl group, a pentasenyl group, a tetraphenylenyl group, a hexaphenyl group, a hexasenyl group, a rubisenyl group, a coroneryl group, a trinaphthylenyl group, a heptaphenyl group, a heptasenyl group, a pyrantrenyl group, an obalenyl group, and the like.

The $C_{7-30}$ alkylaryl group used herein as a substituent indicates that at least one hydrogen atom of the aryl group defined above is substituted with an alkyl group. Examples of such alkylaryl group may include a benzyl group and the like; however, the present invention is not limited thereto. At least one hydrogen atom of the alkylaryl group may also be substituted with a halogen atom, a hydroxy group, a nitro group, a cyano group, or the like.

The $C_{7-30}$ arylalkyl group used herein as a substituent indicates that at least one hydrogen atom of the alkyl group defined above is substituted with an aryl group. Examples of such arylalkyl group may include a 4-tert-butylphenyl group, a 4-ethylphenyl group, and the like; however, the present invention is not limited thereto. At least one hydrogen atom of the arylalkyl group may also be substituted with a halogen atom, a hydroxy group, a nitro group, a cyano group, or the like.

The $C_{1-20}$ heteroalkyl group used herein as a substituent indicates that a hetero atom such as an oxygen atom, a nitrogen atom, a sulfur atom, a phosphorus atom, or the like is contained in the main chain of the alkyl group defined above. At least one hydrogen atom of the heteroalkyl group may also be substituted with a halogen atom, a hydroxy group, a nitro group, a cyano group, or the like.

The $C_{4-30}$ heteroaryl group used herein as a substituent refers to a system which includes at least one hetero atom selected from the group consisting of O, N, S, and P, and comprises at least one aromatic ring. The aromatic rings may be fused with each other, or bound to each other by a single bond, or the like. At least one hydrogen atom of the heteroaryl group may also be substituted with a halogen atom, a hydroxy group, a nitro group, a cyano group, or the like.

The $C_{6-30}$ aryloxy group used herein as a substituent has an aryl-O— structure wherein the aryl is the same as defined above.

The term "haloalkyl group" used herein refers to an alkyl radical to which at least one halogen substituent is bound. Examples of the haloalkyl group may include chloromethyl, fluoroethyl, trifluoromethyl, or pentafluoroethyl.

The compound of Formula 1 may primarily comprise three parts, an electron withdrawing group, a polymerizable functional group, and a lithium ion conductive functional group. The compound of Formula 1 easily receives electrons from a vinyl group by the electron withdrawing group positioned at a terminal thereof during initial charging, and receives electrons at a potential higher than the co-insertion potential of an organic solvent to be grafted on a surface of an electrode, for example, graphite. Then, polymerization is performed together with the grafting, and as a result, an SEI film is formed on the surface of the electrode. The formed SEI film prevents co-insertion that occurs by continuous permeation of the organic solvent into the electrode interlayer structure followed by decomposition of the organic solvent. Also, the SEI film makes the organic solvent affinity functional group included therein, that is, the lithium ion conductive functional group continuously diffuse the lithium ions in the organic solvent into the electrode. As a result, initial efficiency of a lithium battery can be expected to be improved.

The electron withdrawing group of the compound of Formula 1 refers to a functional group that can attract electrons. The term "electron withdrawing" means that a substituent is capable of withdrawing electrons compared to hydrogen located at the same site on one molecule.

Examples of such electron withdrawing group may include a halogen atom, a nitro group, a carboxyl group, a cyano group, a haloalkyl group, an alkenyl group, an alkynyl group, a carboxyaldehyde group, a carboxyamido group, an aryl group, and a quaternary amine group. Preferably, the electron withdrawing group may be a cyano group, a nitro group, a halogen atom, or a substituted or unsubstituted $C_{1-20}$ haloalkyl group.

The compound of Formula 1 is an additive to the organic electrolytic solution. The concentration of the compound of Formula 1 may be in a range of 0.01 to 10 wt %, and preferably in a range of 1 to 5 wt % based on the total weight of the organic electrolytic solution. When the concentration of the additive is less than 0.01 wt % based on the total weight of the organic electrolytic solution, it is difficult to form an improved SEI film, and thus deterioration, swelling and the like can occur when as cycling occurs. When the concentration of the additive is greater than 10 wt % based on the total weight of the organic electrolytic solution, the capacity or efficiency may decrease.

In addition, the compound of Formula 1 may be a compound represented by Formula 2 below:

<Formula 2>

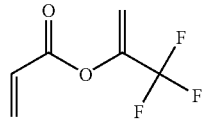

The organic electrolytic solution according to aspects of the present invention primarily includes a lithium salt and a non-aqueous organic solvent. The non-aqueous organic solvent acts as a medium that can transport ions that participate in the electrochemical reaction of the battery, and can be, for example, a mixed organic solvent comprising a high dielectric solvent and a low boiling point solvent. The mixed volume ratio of the high dielectric solvent and the low boiling point solvent may be in a range of 1:1 to 1:9. A mixed volume ratio thereof outside this range is not preferable in terms of discharge capacity and charge and discharge cycle life.

The non-aqueous organic solvent may comprise at least one solvent selected from the group consisting of a cyclic carbonate, a non-cyclic carbonate, an aliphatic carboxylic acid ester, a non-cyclic ether, a cyclic ether, an alkyl phosphoric acid ester, and a fluoride thereof. Preferably, the non-aqueous organic solvent may comprise at least one solvent selected from the group consisting of a cyclic carbonate, a non-cyclic carbonate, and an aliphatic carboxylic acid ester.

In the above mixed organic solvent example, the high dielectric solvent can be a cyclic ether, an alkyl phosphoric acid ester, a cyclic carbonate, or a non-cyclic ether, and the low boiling point solvent can be a non-cyclic carbonate or an aliphatic carboxylic acid ester. Examples of the cyclic carbonate may include ethylene carbonate, propylene carbonate, butylene carbonate, vinylene carbonate, and the like. Examples of the non-cyclic carbonate may include dimethyl carbonate, diethyl carbonate, ethyl methyl carbonate, methyl propyl carbonate, ethyl propyl carbonate, dipropyl carbonate, methyl ethyl carbonate, and the like. Examples of the aliphatic carboxylic acid ester may include methyl formate, methyl acetate, methyl propionate, ethyl propionate, and the like.

In addition, examples of the non-cyclic ether may include gamma-lactones, 1,2-dimethoxyethane, 1,2-diethoxyethane, ethoxymethoxyethane, and the like. Examples of the cyclic ether may include tetrahydrofuran, 2-methyltetrahydrofuran, and the like. Examples of the alkyl phosphoric acid ester may include dimethylsulfoxide, 1,2-dioxolane, trimethyl phosphate, triethylphosphate, trioctylphosphate, and the like.

The lithium salt used in the organic electrolytic solution acts as a supply source of lithium ions in the battery, thereby enabling the basic operation of the lithium battery. The lithium salt may comprise at least one compound selected from the group consisting of $LiPF_6$, $LiBF_4$, $LiAsF_6$, $LiClO_4$, $LiCF_3SO_3$, $LiSbF_6$, $LiN(SO_2CF_3)_2$, $LiC_4F_3SO_3$, $LiAlF_4$, $LiAlCl_4$, $LiN(SO_2C_2F_5)_2$, $LiN(C_xF_{2x+1}SO_2)(C_yF_{2+y}SO_2)$ where x and y are each independently a natural number, LiCl, and LiI; however, the present invention is not limited thereto.

The concentration of the lithium salt in the organic electrolytic solution may be in the range of 0.5 to 2 M. When the concentration of the lithium salt is less than 0.5 M, the conductivity of the organic electrolytic solution is decreased, resulting in poor performance of the battery. When the concentration of the lithium salt is greater than 2.0 M, the viscosity of the organic electrolytic solution is increased, resulting in a reduction in mobility of lithium ions.

Aspects of the present invention also provide a lithium battery including the organic electrolytic solution, a cathode, an anode, and a separator. The cathode is manufactured such that a cathode active material that can reversibly insert and remove lithium ions, a conducting agent, a binder, and an organic solvent are mixed to prepare a cathode active material composition, and then the cathode active material composition is directly coated on a current collector. Alternatively, the cathode active material composition may be cast on a separate support, and then the cathode active material film separated from the support is laminated on the current collector to manufacture a cathode.

The cathode active material used in the cathode active material composition is not particularly limited, but may be a lithium-containing metal oxide. For example, the lithium-containing metal oxide may be an Li—Co-based complex oxide such as $LiCoO_2$, an Li—Ni-based complex oxide such as $LiNiO_2$, an Li—Mn-based complex oxide such as $LiMn_2O_4$ or $LiMnO_2$, an Li—Cr-based complex oxide such as $Li_2Cr_2O_7$ or $Li_2CrO_4$, an Li—Fe-based complex oxide such as $LiFeO_2$, an Li—V-based complex oxide, $LiNi_{x-1}Mn_xO_{2x}$ where x=1, 2, $LiNi_{1-x-y}Co_xMn_yO_2$ where $0 \leq x \leq 0.5$ and $0 \leq y \leq 0.5$, or the like.

Carbon black is used as the conducting agent. Examples of the binder include a vinylidene fluoride/hexafluoropropylene copolymer, polyvinylidenefluoride, polyacrylonitrile, polymethylmethacrylate, polytetrafluoroethylene, mixtures of these materials, or a styrene butadiene rubber-based polymer. Herein, the amounts of the cathode active material, the conducting agent, and the binder can be amounts generally used in a lithium battery, and are not particularly limited.

The current collector on which the cathode active material composition as described above is coated may be any current collector for a cathode in a lithium battery. In particular, the current collector may be an aluminum current collector. The size and thickness of the current collector may be within ranges generally used in a lithium battery.

A cathode according to the present invention may be manufactured as follows. First, a slurry including a binder, a conducting agent, a cathode active material and an organic solvent is uniformly coated on a surface of a current collector, and then the resultant is dried to completely evaporate the organic solvent. As a result, a cathode active material composition layer is formed on the current collector.

The types of cathode active material, binder and conducting agent of the slurry are the same as described above. Examples of the organic solvent may include a chain carbonate such as dimethyl carbonate, ethylmethyl carbonate, diethyl carbonate, dipropyl carbonate, dimethoxyethane, and diethoxyethane; a cyclic carbonate such as, ethylene carbonate, propylene carbonate, butylene carbonate, and γ-butyrolactone; N-methylpyrrolidone; fatty acid ester derivatives; acetone; water; and mixtures thereof.

The anode is manufactured using the same method as that used to manufacture the cathode. That is, an anode active material, a conducting agent, a binder, and an organic solvent are mixed to prepare an anode active material slurry, and then the anode active material slurry is directly coated on a copper current collector. Alternatively, the anode active material slurry may be cast on a separate support, and then an anode active material film separated from the support is laminated on the copper current collector to manufacture an anode. Herein, the amounts of the anode active material, the conducting agent, the binder and the organic solvent may be within ranges generally used in a lithium battery, and are not particularly limited.

The anode active material may be a lithium metal, a lithium alloy, a carbon material, or graphite. The conducting agent, the binder and the organic solvent in the anode active material slurry may be the same as those of the cathode active material composition. If necessary, a plasticizer can be added to the cathode active material composition and the anode active material slurry to form pores inside the cathode and the anode.

The cathode and anode can be separated using a separator. The separator may be any separator that is commonly used for lithium batteries. In particular, the separator may have low resistance to migration of ions in an electrolyte and have an excellent electrolyte-retaining ability. Examples of the separator include glass fiber, polyester, polyethylene, polypropylene, polytetrafluoroethylene (PTFE), a combination thereof, and a material which may be in non-woven or woven fabric form. In particular, a windable separator including polyethylene, polypropylene or the like can be used for a lithium ion battery. A separator that can retain a large amount of an organic electrolytic solution may be used for a lithium-ion polymer battery. A method of preparing these separators will now be described.

A polymer resin, a filler and a solvent are mixed to prepare a separator composition. Then, the separator composition is directly coated on an electrode, and then dried to form a separator film. Alternatively, the separator composition may be cast onto a support and dried. Then, a separator film separated from the support is laminated on the electrode, thereby forming a separator.

The polymer resin is not particularly limited, and may be any polymer resin used in the binder of the electrode plate. Examples of the polymer resin may include a vinylidenefluoride/hexafluoropropylene copolymer, polyvinylidenefluoride, polyacrylonitrile, polymethylmethacrylate and a mixture thereof. In particular, a vinylidenefluoride/hexafluoropropylene copolymer having 8 to 25 wt % of hexafluoropropylene may be used as the polymer resin.

The separator is interposed between the cathode and the anode to form an electrode assembly. The electrode assembly is wound or folded and then sealed in a cylindrical or rectangular battery case. Then, the organic electrolytic solution of these aspects of the present invention is injected into the battery case to complete the manufacture of a lithium battery.

Alternatively, the electrode assembly may be stacked in a bi-cell having a cathode/separator/anode/separator/cathode structure, or stacked in a laminated structure in which a unit battery structure is repeated, and inserted into an organic electrolytic solution. The resultant is put into a pouch and hermetically sealed, thereby completing a lithium polymer battery.

FIG. 1 is a schematic diagram illustrating a structure of a lithium battery according to an embodiment of the present invention. Referring to FIG. 1, the lithium battery according to the current embodiment of the present invention is formed such that an electrode assembly 12 including a cathode 13, an anode 15 and a separator 14 disposed between the cathode 13 and the anode 15 is put into a can 10 together with an electrolytic solution, and the top portion of the can 10 is sealed with a cap assembly 20. The cap assembly 20 includes a cap plate 40, an insulating plate 50, a terminal plate 60, and an electrode terminal 30. The cap assembly 20 is combined with an insulating case 70 to seal the can 10.

The electrode terminal 30 is inserted into a terminal hole 41 that is formed in the center of the cap plate 40. In this case, in order to insulate the electrode terminal 30 and the cap plate 40 from each other, a tube-type gasket 46 is combined with an outer surface of the electrode terminal 30, thereby being inserted into the terminal hole 41. After the cap assembly 20 is assembled with the top portion of the can 10, an electrolytic solution is injected into the can 10 through an electrolyte injecting hole 42, and the electrolytic solution injecting hole 42 is sealed using a plug 43. The electrode terminal 30 is connected to an anode tab 17 of the anode 15 or a cathode tab 16 of the cathode 13 to act as an anode terminal or a cathode terminal.

Hereinafter, the present invention will be described more specifically with reference to the following examples. The following examples are for illustrative purposes only and are not intended to limit the scope of the invention.

Example 1

Preparation of Electrolytic Solution 5 wt % of the compound of Formula 1 was added as an additive to an organic solvent comprising propylene carbonate and 1 M $LiClO_4$ was used as a lithium salt to prepare an organic electrolytic solution.

Example 2

Preparation of Electrolytic Solution 3 wt % of the compound of Formula 1 was added as an additive to an organic solvent comprising ethylene carbonate, diethyl carbonate and fluoroethylene carbonate (volume ratio of 2:6:2), and 1M $LiPF_6$ was used as a lithium salt to prepare an organic electrolytic solution.

Comparative Example 1

Preparation of Electrolytic Solution

1M $LiClO_4$ was added as a lithium salt to an organic solvent comprising propylene carbonate to prepare an organic electrolytic solution.

Comparative Example 2

Preparation of Electrolytic Solution

1M $LiPF_6$ was added as a lithium salt to an organic solvent comprising ethylene carbonate, diethyl carbonate and fluoroethylene carbonate (volume ratio of 2:6:2) to prepare an organic electrolytic solution.

Example 3

Manufacture of Lithium Ion Battery

A graphite powder of mesocarbon microbeads (MCMB, Osaka Gas Chemicals Company) and a binder in which 5 wt % of polyvinylidenefluoride (PVdF) was dissolved in N-methylpyrrolidone (NMP) in a weight ratio of 95:5 were added to an agate mortar and mixed together to prepare a slurry.

The slurry was cast on a copper foil having a thickness of 19 μm by using a doctor blade with a gap of 100 μm. Then, the resultant was put into an oven at 90° C. and first dried for about 2 hours to evaporate NMP. Then, the resultant was secondarily dried in a vacuum oven at 120° C. for 2 hours to completely evaporate NMP. The obtained resultant was roll-pressed to manufacture an anode having a thickness of 60 μm.

The anode, a cathode formed of lithium metal, a separator formed of polyethylene, and the organic electrolytic solution prepared in Example 1 were used to manufacture a 2016 size coin cell.

Example 4

Manufacture of Lithium Ion Battery

A graphite powder of mesocarbon microbeads (MCMB, Osaka Gas Chemicals Company) and Si powder were ball milled to prepare a complex. Then, the complex, a binder in which 15 wt % of polyvinylidenefluoride (PVdF) was dissolved in N-methylpyrrolidone (NMP) and a conducting agent in a weight ratio of 70:15:15 were added to an agate mortar and mixed together to prepare a slurry.

The slurry was cast on a copper foil having a thickness of 19 μm by using a doctor blade with a gap of 100 μm. Then the resultant was put into an oven at 90° C. and first dried for about 2 hours to evaporate NMP. Then, the resultant was secondarily dried in a vacuum oven at 120° C. for 2 hours to completely evaporate NMP. The obtained resultant was roll-pressed to manufacture an anode having a thickness of 60 μm.

The anode, a cathode formed of lithium metal, a separator formed of polyethylene, and the organic electrolytic solution prepared in Example 2 were used to manufacture a 2016 size coin cell.

Comparative Example 3

Manufacture of Lithium Ion Battery

A coin cell was manufactured in the same manner as in Example 3, except that the organic electrolytic solution prepared in Comparative Example 1 was used.

Comparative Example 4

Manufacture of Lithium Ion Battery

A coin cell was manufactured in the same manner as in Example 4, except that the organic electrolytic solution prepared in Comparative Example 2 was used.

Experimental Example 1

Test of Charge-Discharge Characteristics of a Battery

The coin cells manufactured in Example 3 and Comparative Example 3, each having a cell capacity of 1.38 mAh, were each charged at a constant current of 0.1 C rate until the voltage of the cell reached 0.001 V with respect to a Li electrode. Then, the coin cells were each charged at a constant voltage of 0.001 V until the current of the cell reached 0.02 C rate with respect to the cell capacity. Then, the coin cells were each discharged at a constant current of 0.1 C rate of the cell capacity until the voltage of the cell reached 1.5 V. As a result, charge-discharge capacities of the coin cells were obtained.

Experimental Example 2

Test of Charge-Discharge Characteristics of Batteries

The coin cells manufactured in Example 4 and Comparative Example 4, each having a cell capacity of 2.36 mAh, were each charged at a constant current of 0.1 C rate until the voltage of the cell reached 0.001 V with respect to a Li electrode. Then, the coin cells were each discharged at a constant current of 0.1 C rate of the cell capacity until the voltage of the cell reached 1.5 V. As a result, charge-discharge capacities of the coin cells were obtained. Initial charge-discharge efficiencies of the coin cells were calculated therefrom. The initial charge-discharge efficiencies of the coin cells are represented by Equation 1 below.

$$\text{Initial charge-discharge efficiency}(\%) = 1^{st} \text{ cycle discharge capacity}/1^{st} \text{ cycle charge capacity} \quad \text{<Equation 1>}$$

Figure 2:
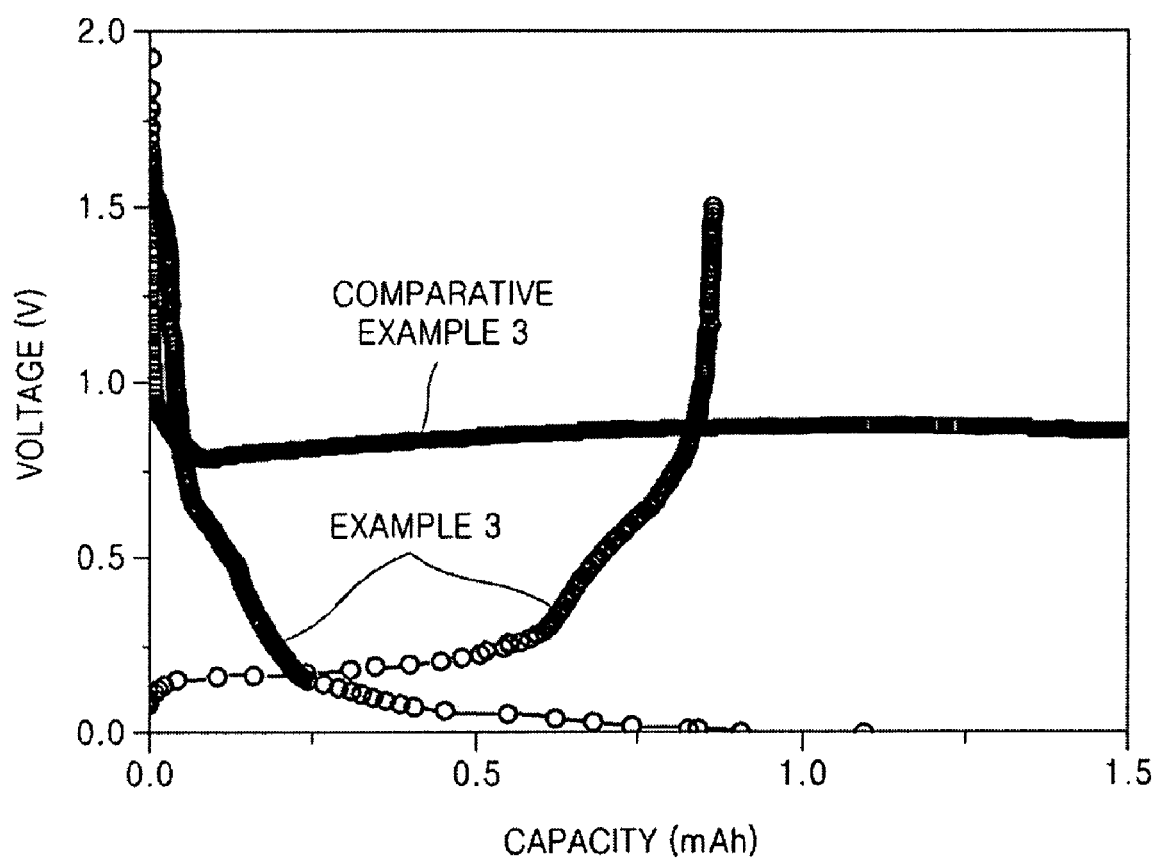
FIG. 2 is a graph showing first cycle charge-discharge efficiencies of batteries manufactured in Example 3 and Comparative Example 3.

FIG. 2 is a graph showing first cycle charge-discharge efficiencies of the batteries manufactured in Example 3 and Comparative Example 3. Referring to FIG. 2, in the case of Comparative Example 3 using the solvent alone, insertion of lithium ions did not occur. However, in the case of Example 3 using the compound of Formula 1 as an additive, an SEI was formed on the surface of the electrode to smoothly insert and remove lithium ions, and the coin cell of Example 3 had a very high efficiency, i.e., about 80%.

Figure 3:
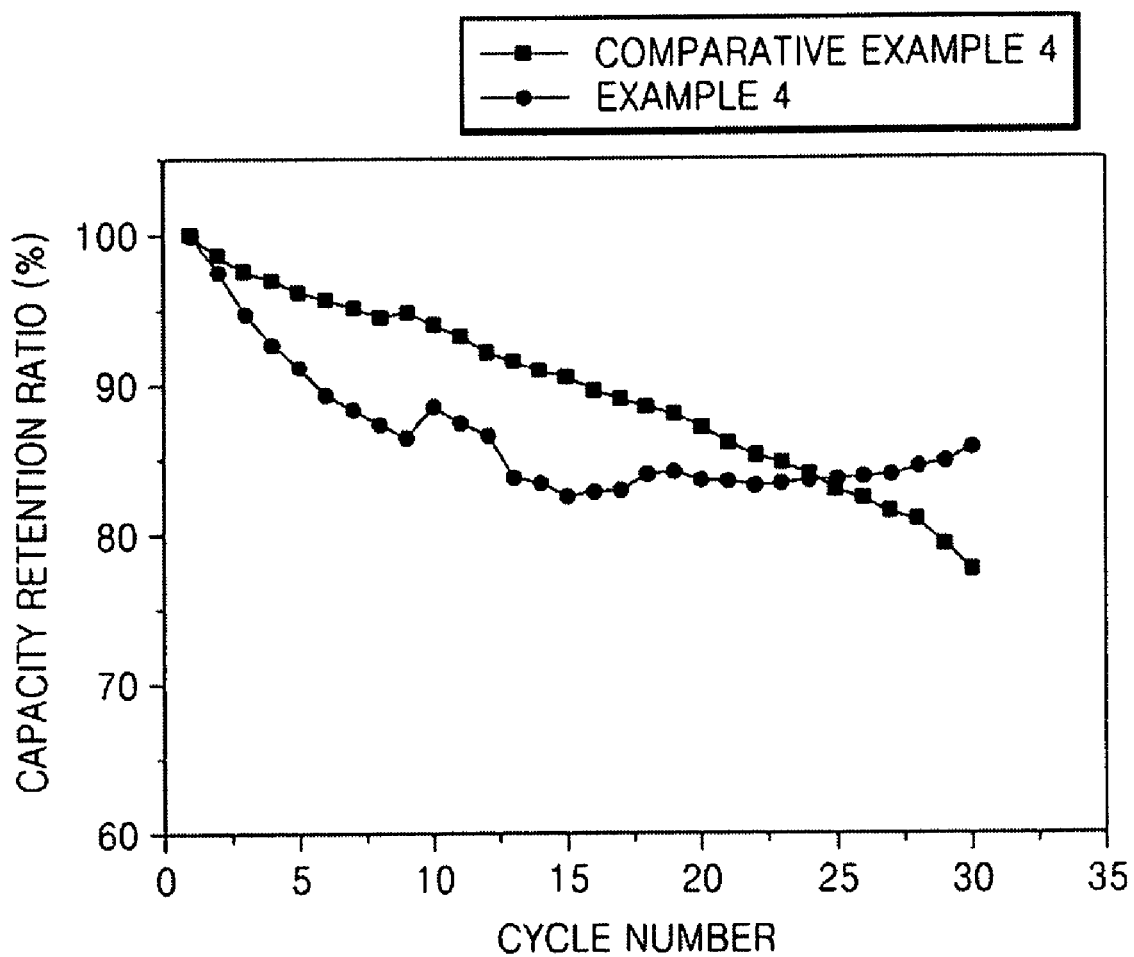
FIG. 3 is a graph showing cycle lives of batteries manufactured in Example 4 and Comparative Example 4.

FIG. 3 is a graph showing cycle lives of the batteries manufactured in Example 4 and Comparative Example 4. Referring to FIG. 3, although the coin cell manufactured in Example 4 had a small amount of capacity reduction in cycle life in the initial stage, it had improved cycle characteristics, as compared with the coin cell manufactured in Comparative Example 4.

A lithium battery using the organic electrolytic solution according to aspects of the present invention can have improved cycle characteristics and cycle life characteristics by forming a uniform and stable SEI film during initial charging.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic electrolytic solution comprising:
    a lithium salt;
    a non-aqueous organic solvent; and
    a compound represented by Formula 1 below:

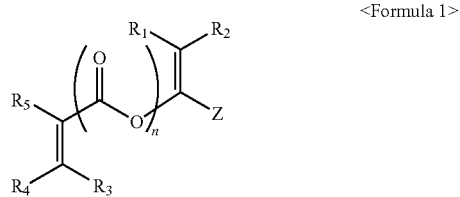

<Formula 1> wherein n is an integer of 1 to 5,
Z is an electron withdrawing group, and
$R_1$, $R_2$, $R_3$, $R_4$, and $R_5$ are each independently a hydrogen atom, a halogen atom, a nitro group, a cyano group, a carboxyl group, an acyl group, a sulfonyl group, a carboxyaldehyde group, a carboxyamido group, a quaternary amine group, a substituted or unsubstituted $C_{2-30}$ acyl group, a substituted or unsubstituted $C_{1-20}$ alkyl group, a substituted or unsubstituted $C_{1-20}$ heteroalkyl group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{6-30}$ heteroaryl group, a substituted or unsubstituted $C_{7-30}$ alkylaryl group, a substituted or unsubstituted $C_{7-30}$ arylalkyl group, a substituted or unsubstituted $C_{6-30}$ aryloxy group, a substituted or unsubstituted $C_{1-20}$ alkoxy group, a substituted or unsubstituted $C_{2-20}$ alkoxycarbonyl group, a substituted or unsubstituted $C_{7-30}$ aryloxycarbonyl group, a $C_{8-30}$ aralkyloxycarbonyl group, or a substituted or unsubstituted $C_{1-20}$ haloalkyl group.

2. The organic electrolytic solution of claim 1, wherein the electron withdrawing group is one selected from the group consisting of a cyano group, a nitro group, a halogen atom, and a substituted or unsubstituted $C_{1-20}$ haloalkyl group.

3. The organic electrolytic solution of claim 1, wherein n is 1.

4. The organic electrolytic solution of claim 1, wherein the concentration of the compound of Formula 1 is in the range of 0.01 to 10 wt % based on the total weight of the organic electrolytic solution.

5. The organic electrolytic solution of claim 1, wherein the concentration of the compound of Formula 1 is in the range of 1 to 5 wt % based on the total weight of the organic electrolytic solution.

6. The organic electrolytic solution of claim 1, wherein the non-aqueous organic solvent is a mixed organic solution comprising a high dielectric solvent and a low boiling point solvent.

7. The organic electrolytic solution of claim 1, wherein the non-aqueous organic solvent comprises at least one solvent selected from the group consisting of a cyclic carbonate, a non-cyclic carbonate, an aliphatic carboxylic acid ester, a non-cyclic ether, a cyclic ether, an alkyl phosphoric acid ester, and a fluoride thereof.

8. The organic electrolytic solution of claim 7, wherein the cyclic carbonate comprises at least one solvent selected from the group consisting of ethylene carbonate, propylene carbonate, butylene carbonate, and vinylene carbonate.

9. The organic electrolytic solution of claim 1, wherein the compound of Formula 1 is a compound represented by Formula 2 below:

<Formula 2>

10. A lithium battery comprising:
    the organic electrolytic solution according to claim 1;
    a cathode;
    an anode; and
    a separator disposed between the cathode and the anode.

* * * * *